United States Patent
De La Veaux et al.

(10) Patent No.: US 7,771,666 B2
(45) Date of Patent: Aug. 10, 2010

(54) METHOD OF PRODUCING NANOPARTICLES USING A EVAPORATION-CONDENSATION PROCESS WITH A REACTION CHAMBER PLASMA REACTOR SYSTEM

(75) Inventors: Stephan Claude De La Veaux, Wilmington, DE (US); Lu Zhang, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 683 days.

(21) Appl. No.: 10/537,042

(22) PCT Filed: Dec. 16, 2003

(86) PCT No.: PCT/US03/40246

§ 371 (c)(1),
(2), (4) Date: Jun. 1, 2005

(87) PCT Pub. No.: WO2004/056461

PCT Pub. Date: Jul. 8, 2004

(65) Prior Publication Data

US 2006/0159596 A1     Jul. 20, 2006

Related U.S. Application Data

(60) Provisional application No. 60/434,158, filed on Dec. 17, 2002.

(51) Int. Cl.
*B01J 12/00* (2006.01)
*C09C 1/00* (2006.01)
*C01G 23/047* (2006.01)

(52) U.S. Cl. .................. 422/129; 422/150; 422/151; 422/158; 423/612

(58) Field of Classification Search ............... 75/10.19; 422/151, 150, 129, 186.21, 186.29, 194, 422/158; 423/612; 977/844
See application file for complete search history.

(56) References Cited

U.S. PATENT DOCUMENTS

| | | | | |
|---|---|---|---|---|
| 3,069,281 A | * | 12/1962 | Wilson | ............ 106/437 |
| 3,403,001 A | | 9/1968 | Mas et al. | |
| 3,586,489 A | * | 6/1971 | Hilgers et al. | ............ 422/158 |
| 3,642,442 A | * | 2/1972 | Hoekje et al. | ............ 423/613 |

(Continued)

OTHER PUBLICATIONS

Gruenberger et al, Continuous Production of Fullerenes and Other Carbon Nanomaterials on a Semi-Industrial Scale using Plasma Technology, Oct. 14, 2002, American Institute of Physics, vol. 633, pp. 7-11.*

(Continued)

*Primary Examiner*—Walter D Griffin
*Assistant Examiner*—Natasha Young (57) ABSTRACT

The present invention provides a method and apparatus for the controlled synthesis of nanoparticles using a high temperature process. The reactor chamber includes a high temperature gas heated by means such as a plasma torch, and a reaction chamber. The homogenizer includes a region between the reactant inlets and the plasma (the spacer zone) to ensure that feeds from the reactant inlets are downstream of the recirculation zone induced by the high temperature gas. It also includes a region downstream of the reactant inlets that provides a nearly I dimensional (varying only in the axial direction) flow and concentration profile in the reaction zone to produce nanoparticles with narrow size distribution.

9 Claims, 6 Drawing Sheets

U.S. PATENT DOCUMENTS

| | | | |
|---|---|---|---|
| 3,650,694 A | * | 3/1972 | Allen .................. 423/613 |
| 3,051,639 A | | 8/1982 | Anderson |
| 5,749,937 A | | 5/1998 | Detering et al. |
| 5,788,738 A | | 8/1998 | Pirzada et al. |
| 5,851,507 A | | 12/1998 | Pirzada et al. |
| 5,874,134 A | | 2/1999 | Rao et al. |
| 5,935,293 A | | 8/1999 | Detering et al. |
| 2002/0155059 A1 | * | 10/2002 | Boulos et al. ............ 423/613 |
| 2002/0192138 A1 | * | 12/2002 | Yuill .................. 423/337 |

OTHER PUBLICATIONS

International Search Report.

S. Brunauer et. al., Adsorption of Gases in Multimolecular Layers, 1938, pp. 309-319, vol. 60.

* cited by examiner

Figure 3. SEM micrograph of the TiO$_2$ nanoparticles produced under the condition described in Example A FIG 4
Example 2

Figure 5 SEM micrograph of the TiO$_2$ nanoparticles produced under the condition described in Example 2.

Figure 6. SEM micrograph of the TiO$_2$ nanoparticles produced under the condition described in Example 2

Figure 7

METHOD OF PRODUCING NANOPARTICLES USING A EVAPORATION-CONDENSATION PROCESS WITH A REACTION CHAMBER PLASMA REACTOR SYSTEM

CROSS-REFERENCE TO RELATED APPLICATIONS

Cross-reference is made to U.S. provisional application No. 60/434,158 filed on Dec. 17, 2002, which is incorporated herein by reference in its entirety.

FIELD OF THE INVENTION

The present invention provides a method and apparatus for the controlled synthesis of nanosize particles using a high temperature process. The reactor chamber of the present invention includes a high temperature heating means such as a plasma torch, and a novel reaction chamber. The reaction chamber is a portion of the reactor chamber having a region between the hot gas inlet and the reactant inlets (the spacer zone) to ensure that feeds from the reactant inlets enter the reactor chamber downstream of the recirculation zone induced by the high temperature gas discharge. This shift in the location where the reactant gas is contacted by a hot carrier gas provides a nearly 1-dimensional (varying only in the axial direction) flow and concentration profile in the reaction zone yielding nanoparticles having narrow size distribution.

BACKGROUND OF THE INVENTION

The scientific and technological issues of nanostructured particles and materials are currently attracting considerable attention. The small size of nanoparticles (generally used to indicate particles less than 100 nm), which can be responsible for the different properties (electronic, optical, electrical, magnetic, chemical, and mechanical) of nanoparticles and nanostructured materials with respect to the bulk material, makes them suitable for new applications. Nanosized powders have been synthesized by a number of processes including colloidal precipitation, mechanical grinding and gas phase nucleation and growth. Most synthesis methods of nanoparticles in the gas phase are based on homogeneous nucleation in the gas phase and subsequent condensation and coagulation. The gas phase synthesis route (aerosol route) makes it possible to generate new nanoparticles and nanostructured new materials from, in principle, a nearly unlimited variety of starting materials. However, two challenges need to be addressed for nanoparticles produced by aerosol process in order to be suitable for various applications, namely, (1) controlled size distribution of the primary particles, and (2) degree of aggregation, which has a direct effect on dispersibility. For most of the applications, it is very difficult to obtain the desired properties when the nanoparticles employed are either widely distributed in primary particle size or highly aggregated or both. Therefore, it is important to control the process parameters such as pressure, temperature, and concentration that aid in the determination of the properties of the resulting particles.

Jet expansion is a convenient fluid mechanical configuration for the controlled generation of ultrafine particles by gas-to-particle conversion. Condensable vapor can be introduced into the jet by evaporation from a solid or liquid into the gas upstream from the jet, or by chemical reaction in the jet. The jet configuration permits particle production with high throughputs under controlled conditions of temperature and dilution. U.S. Pat. Nos. 5,935,293 and 5,749,937 to Detering et al., teach a fast quenching reactor and method for thermal conversion of reactants to desired end products such as solid particles. The rapid quenching was achieved by adiabatic and isentropic expansion of gases in a converging-diverging nozzle. By converging-diverging is meant a nozzle whose area changes in the axial direction, first reducing ("converging") to a minimum ("throat"), then increasing ("diverging"). Under sufficiently high pressure gradients, the flow velocity will increase with axial location, reaching a Mach Number of 1 at the throat and increasing to greater than 1 in the diverging section. The expansion taught can result in cooling rate exceeding $10^{10\circ}$ C./s, thus preserving reaction products that are in equilibrium only at high temperatures. U.S. Pat. Nos. 5,788,738 and 5,851,507 to Pirzada et al., teaches similar approaches to the production of nanoscale powders by ultrarapid thermal quench processing of high-temperature vapors through a boundary-layer converging-diverging nozzle, which is an adiabatic expansion process. The vapor stream is rapidly quenched at rates of at least 1,000° C./s, preferably greater than $10^{6\circ}$ C./s, to inhibit the continued growth of the nucleated particles and produce nanosize powder of narrow size distribution. One common feature of Detering et al., and Pirzada et al.'s work is that the sole purpose of employing a nozzle that is of a converging-diverging shape is to achieve rapid quench that is at least greater than 1,000° C./s, preferably greater than $10^{6\circ}$ C./s by hypersonic nozzle expansion.

U.S. Pat. Nos. 5,874,134 to Rao et al., teaches a method of producing nanostructured material by hypersonically expanding a particle-gas mixture through a convergent nozzle and directing the resulting jet against an impaction substrate. Similar work has been described where nanosize particles with a narrow size distribution were generated by subsonically expanding thermal plasma carrying vapor-phase precursors through a convergent nozzle of a similar shape.

A serious difficulty with the jet expansion as taught in the prior art is that these techniques require large pressure gradients to accelerate the flows; necessitating large and expensive pumps. All the aforementioned nozzles are operated at downstream pressure (gas pressure exiting the nozzle) lower than 760 torr, often considerably lower.

In addition, the discharging of hot gas into an open domain, such as a plasma gas entering a reaction chamber, results in a jet that will entrain local fluid, causing a recirculation region. Any reacting gas or particles so entrained in the recirculation zone will be exposed, possibly on multiple occasions, to the high temperature gas. This may greatly accelerate aggregation, sintering and coalescence of the particles, all of which are generally undesirable. Although not all of the reactant gas and particles may be entrained in the recirculation region induced by the hot gas discharge, the agglomerates formed during recirculation will enhance agglomerate formation downstream of the recirculation region through Brownian and turbulent collisions. The surprising advantages achieved in separating the location of the reactant inlets upstream of the point where hot carrier gas and the reactants gas come in contact with one another results in this point of contact being downstream of the recirculation in the region. The prior patent literature in this area has failed to teach the novel process results that can be achieved through the simple nozzle design of the present invention.

Presently, the teachings in the patent literature consider nozzle flow only in the thermodynamic sense; i.e., that the accelerating flow in the nozzle, when there is a sufficient pressure drop through the nozzle (which is controlled by the exit pressure), leads to lower dynamic temperature and pressure, hence leading to lower collision and coalescence rates. The issue here is not the nozzle per se, but the large pressure drop required for such flow, which can be expensive to maintain and difficult to scale. For example, accelerating the flow to a Mach number of 1, which requires a pressure drop of nearly a factor of 2, reduces the gas temperature to 75% of the stagnation temperature. This is generally the case for $\gamma \sim 5/3$, where $\gamma$ is defined as the ratio of the specific heat at constant pressure to the specific heat at constant volume. The ratio of specific heat at constant pressure to the specific heat at constant volume, $\gamma$, is usually between 7/5 for diatomic gases and 5/3 for monatomic gases. Further cooling requires supersonic flow with substantially greater pressure drops. Since the temperature drop comes from isentropic adiabatic cooling, special precautions must be taken during the quench step to avoid recovering the temperature when slowing down the particles to subsonic velocities. The present invention demonstrates that nozzle-type flow can be used to produce nanosized particles without the need for thermodynamic cooling; the nozzle is operating under nearly isobaric conditions, which can be defined thermodynamically as the pressure ratio between the exit and inlet of the nozzle being less than 0.85, leading to Mach numbers of under 0.40.

Therefore, the present invention satisfies a need of developing a cost-effective high temperature aerosol process that is capable of making various types of nanopowders of narrow size distribution. The inventors have accomplished their desired result to invent a cost-efficient reactor and process that produces nanoparticles of the above described narrow size distribution for a variety of materials by controlling the fundamental fluid dynamics in the reactor, especially in the high temperature region, taking into consideration the recirculating flow and turbulent diffusion that may occur in the region between the hot gas inlets) and the reactants inlet(s). Thermodynamic cooling as described in the patent literature can be used in conjunction with this invention to further improve the particle size distribution.

The main objective of this invention relates to a high temperature apparatus (aerosol reactor) useful for producing nanoparticles that are easily dispersed (with a small degree of aggregation, less than 50 primary particles in an aggregate after the dispersion step, with primary particles that are narrowly distributed in size of about 10 nm and 100 nm, preferably between 10 nm and 50 nm and a BET surface area equal to or greater than about 10 $m^2/g$). Nanoparticles are formed by injecting the reactants into a high temperature reaction chamber, followed by vapor phase reaction, gas-phase nucleation and subsequent particle growth by condensation and coagulation. The reaction zone contains a unique reaction chamber that is precisely designed to reduce gas and particle entrainment in the reactant inlets region and to promote efficient mixing in the region downstream of the reactant inlet(s). These features are the key to produce less aggregated nanoparticles with narrow size distribution.

This apparatus can be used for producing novel nanoparticles and nanophase materials by a high temperature aerosol process either with or without a chemical reaction using any type of energy source.

SUMMARY OF THE INVENTION

The present invention is a reactor for the production of nanoparticles in an aerosol process comprising:

(a) a reaction chamber having a wall, an inlet and an outlet the inlet for introducing a hot carrier gas to the reaction chamber which hot carrier gas flows from the inlet through the reaction chamber and out the outlet, (b) a quench zone located downstream of the reaction chamber having a quench zone inlet and a quench zone outlet, (c) one or more quench inlets being positioned approximately about the outlet of the reaction chamber for introducing a quench material, (d) one or more reactant inlets positioned between the reaction chamber inlet and the quench zone inlets for introducing one or more reactants;

the reaction chamber comprising: (i) a spacer zone having a length, $L_1$, extending from the reaction chamber inlet and ending approximately about the reactant inlets and (ii) a homogenization zone having a length $L_2$ extending from approximately the location of the reactant inlets and ending approximately about the quench zone inlet; the spacer zone for allowing the hot carrier gas to allow flow reattachment and carry the reactants to the homogenization zone, the homogenization zone for contacting the reactants under conditions suitable for forming a reaction product and passing the reaction product to the quench zone, $L_1$ being sufficient for the hot carrier gas to attach to the wall of the spacer zone of the reaction chamber prior to the reactant inlets and $L_2$ being sufficient for a residence time of the reactants within the homogenization zone suitable for forming the reaction product which when withdrawn from the outlet of the quench zone is a nanoparticle.

The present invention also discloses an aerosol process for producing nanosize particles, comprising:

(a) introducing a hot carrier gas into an aerosol reactor, the aerosol reactor comprising a reaction chamber and a quench zone having an inlet and an outlet, the reaction chamber having a wall, a carrier gas inlet and an outlet, one or more quench material inlets being positioned approximately about the outlet of the reaction chamber, one or more reactant inlets positioned between the carrier gas inlet and the quench material inlets; the reaction chamber having: (i) a spacer zone having a length, $L_1$, extending from the reaction chamber inlet and ending approximately about the reactant inlets and (ii) a homogenization zone having a length $L_2$ extending from approximately the location of the reactant inlets and ending approximately about the quench zone inlet; wherein the hot carrier gas is introduced to the reaction chamber at the carrier gas inlet, the hot carrier gas flowing through the reaction chamber and out the outlet into the quench zone;

(b) introducing one or more reactants into the reaction chamber at the reactant inlets, the reactants contacting the hot carrier gas in the spacer zone and passing to the homogenization zone to form a reaction product, $L_1$ being sufficient for the hot carrier gas to attach to the wall of the spacer zone of the reaction chamber prior to the reactant inlets and $L_2$ being sufficient for a residence time of the reactants within the homogenization zone suitable for forming the reaction product;

(c) passing the reaction product to the quench zone; and (d) withdrawing from the outlet of the quench zone a nanoparticle reaction product.

Additionally, the present invention is a reactor for the production of nanoparticles from an aerosol process comprising:

(a) a reactor chamber having axially spaced inlet and outlet ends along the reactor axis wherein positioned at the inlet end of the reactor chamber is a high temperature heating means to heat a carrier gas having a flow direction axially from the reaction chamber inlet downstream through the reaction chamber and out the chamber outlet and wherein one or more quench gas inlets are positioned up stream from the outlet end of the reactor chamber for introducing a quench gas for cooling;

(b) a reaction chamber having an axially spaced entrance and an exit wherein in the vicinity of the exit, the homogenizer converges to nozzle tip, the entrance of the homogenizer being aligned with the inlet to the reaction chamber and the homogenizer being inserted within the reaction chamber and held in place by a homogenizer holder such that the homogenizer extends from the inlet end of the reaction chamber securely fitting against the inlet end for at least a portion of the homogenizer's overall length and wherein the homogenizer comprising two zones: (i) a spacer zone having a length, L1, extending from the reaction chamber entrance and ending where one or more reactant inlet tubes' are positioned, after having passed through a wall of the reaction chamber, to deliver one or more reactants into the reaction chamber so the reactants contact the hot carrier gas and (ii) a homogenization zone extending from the reactant inlet tubes' location to a position down stream of the quench gas inlets; and wherein carrier gas and reactants mix and react in the homogenization zone and pass through the flow homogenization exit nozzle to enter a quench zone of the reaction chamber defined by the quench gas inlet location in a reaction chamber wall and the reaction chamber outlet and wherein L1 of the spacer zone must be long enough to have the hot gas flow attached to walls of the reaction chamber before the hot gas reaches the reactant inlets and the overall length (L1+L2) of the reaction chamber is designed to a residence time sufficient that the following tasks are completed before gas flow exiting the homogenizer: (1) gas flow in the reaction chamber has achieved a one-dimensional flow and concentration profile; and (2) gas-phase nucleation of product particles has been initiated.

This invention also provides an aerosol process for producing nanosize particles, comprising the steps:

(a) introducing a carrier gas into a reactor chamber having (i) axially spaced inlet and outlet ends along the reactor axis wherein positioned at the inlet end of the reactor chamber is a high temperature heating means to heat a carrier gas having a flow direction axially from the reaction chamber inlet downstream through the reaction chamber and out the chamber outlet and wherein one or more quench gas inlets are positioned up stream from the outlet end of the reactor chamber for introducing a quench gas for cooling; and (ii) a reaction chamber having an axially spaced entrance and an exit wherein in the vicinity of the exit, the homogenizer converges to nozzle tip, the entrance of the homogenizer being aligned with the inlet to the reaction chamber and the homogenizer being inserted within the reaction chamber and held in place by a homogenizer holder such that the homogenizer extends from the inlet end of the reaction chamber securely fitting against the inlet end for at least a portion of the homogenizer's overall length and wherein the homogenizer comprising two zones: (i) a spacer zone having a length, L1, extending from the reaction chamber entrance and ending where one or more reactant inlet tubes are positioned, after having passed through a wall of the reaction chamber, to deliver one or more reactants into the reaction chamber so the reactants contact the hot carrier gas and (ii) a homogenization zone extending from the reactant inlet tubes' location to a position down stream of the quench gas inlets; and wherein carrier gas and reactants mix and react in the homogenization zone and pass through the flow homogenization exit nozzle to enter a quench zone of the reaction chamber defined by the quench gas inlet location in a reaction chamber wall and the reaction chamber outlet and wherein L1 of the spacer zone must be long enough to have the hot gas flow attached to walls of the reaction chamber before the hot gas reaches the reactant inlets and the overall length (L1+L2) of the reaction chamber is designed to a residence time sufficient that the following tasks are completed before gas flow exiting the homogenizer: (1) gas flow in the reaction chamber has achieved a near one dimensional flow and concentration profile; and (2) gas-phase nucleation of product particles has been initiated;

(b) heating the carrier gas by thermal contact with the heating means to a temperature to initiate reaction of the carrier gas with one or more reactants;

(c) introducing one or more reactants through the reactant inlet tubes to form a reaction mixture;

(d) adjusting flow rates of the carrier gas and reactants such that reaction mixture flows through the flow homogenization chamber at a rate such that (1) flow of the reaction mixture is characterized by one-dimensional flow and a one-dimensional concentration profile; and (2) gas-phase nucleation of the product has been initiated;

(e) immediately injecting quench gas through the quench gas inlet tubes as the reaction mixture flow enters the quench zone so that particle coagulation and coalescences is reduced and temperature of the reaction mixture and product is decreased; and (f) separating and collecting the product.

This invention also provides a reaction chamber for minimizing flow recirculation in a reactor, the reaction chamber comprising an axially spaced entrance and an exit wherein in the vicinity of the exit the homogenizer converges to nozzle tip, the entrance of the homogenizer being aligned with the inlet to the reaction chamber and the homogenizer being inserted within the reaction chamber and held in place by a homogenizer holder such that the homogenizer extends from the inlet end of the reaction chamber securely fitting against the inlet end for at least a portion of the homogenizer's overall length and wherein the homogenizer comprising two zones: (i) a spacer zone having a length, L1, extending from the reaction chamber entrance and ending where one or more reactant inlet tubes are positioned, after having passed through a wall of the reaction chamber, to deliver one or more reactants into the reaction chamber so the reactants contact the hot carrier gas and (ii) a homogenization zone extending from the reactant inlet tubes location to a position down stream of the quench gas inlets; and wherein carrier gas and reactants mix and react in the homogenization zone and pass through the flow homogenization exit nozzle wherein L1 of the spacer zone must be long enough to have the hot gas flow attached to walls of the reaction chamber before the hot gas reaches the reactant inlets and the overall length (L1+L2) of the reaction chamber is designed to a residence time sufficient that before gas flow exits the homogenizer: gas flow in the reaction chamber has achieved a near one dimensional flow and concentration profile.

DETAILED DESCRIPTION

The plasma reactor system of this invention can be used to make titanium dioxide (titania) nanoparticles and other nanoparticles via either reduction or oxidation processes. In the present invention, the term carrier gas is defined as a gas or gas vapor stream that is heated before entering the reaction chamber by the high temperature heating means. Thus referring to FIG. 1, the carrier gas is the gas or gas mixture that enters the reactor chamber via 16. The carrier gas may be a mixture of an inert gas and at least one reactant. For example, in the use of the present invention to make TiO$_2$ nanoparticles, the carrier gas may be argon alone or a mixture of argon and oxygen, or any inert gas or inert gas and oxygen. In the present invention the term "reactant inlets" are a means to introduce at least one reactant into the reaction chamber. The reactant may be mixture of one or more reactant gases or vapors with or without an inert gas, where reactants include at least one or a mixture of reaction agent compounds that are required to make the desired product. It is essential for achieving the desired particle size distribution that no reaction be initiated between the reactants before the reaction components enter the reaction chamber.

The term "attached" or "attachment" with respect to fluid flow refers to a region where, in moving perpendicular from the boundary wall into the bulk of the fluid, the flow parallel to the boundary does not change sign (that is, the flow parallel to the boundary is moving in the same direction, varying only in amplitude). The term "separated" with respect to fluid flow refers to a region where, in moving perpendicular from the boundary wall into the bulk of the fluid, the flow parallel to the boundary changes sign. The zone between "separated" flow and "attached" flow is referred as the "stagnation point" and represents a singular solution to the boundary layer fluid equation.

The reaction chamber of the present invention comprises a wall, an inlet and an outlet, the inlet for introducing a hot carrier gas to the reaction chamber, and the hot carrier gas flows from the inlet through the reaction chamber and out the outlet. It further comprises a homogenizer which provides the spacer zone and the homogenization zone. The homogenizer can be made of any suitable material, with copper or ceramic materials being preferred.

A feature of this invention is a reaction chamber that is used in a high temperature aerosol reactor for the controlled synthesis of nanoparticles. This reaction chamber promotes near one-dimensional flow and concentration profiles by enhanced mixing of the reactants and carrier gas as these gases flow down stream through the spacer zone, the homogenization zone, and into the quench zone. The reaction chamber can be used with very small pressure gradients.

Figure 1:
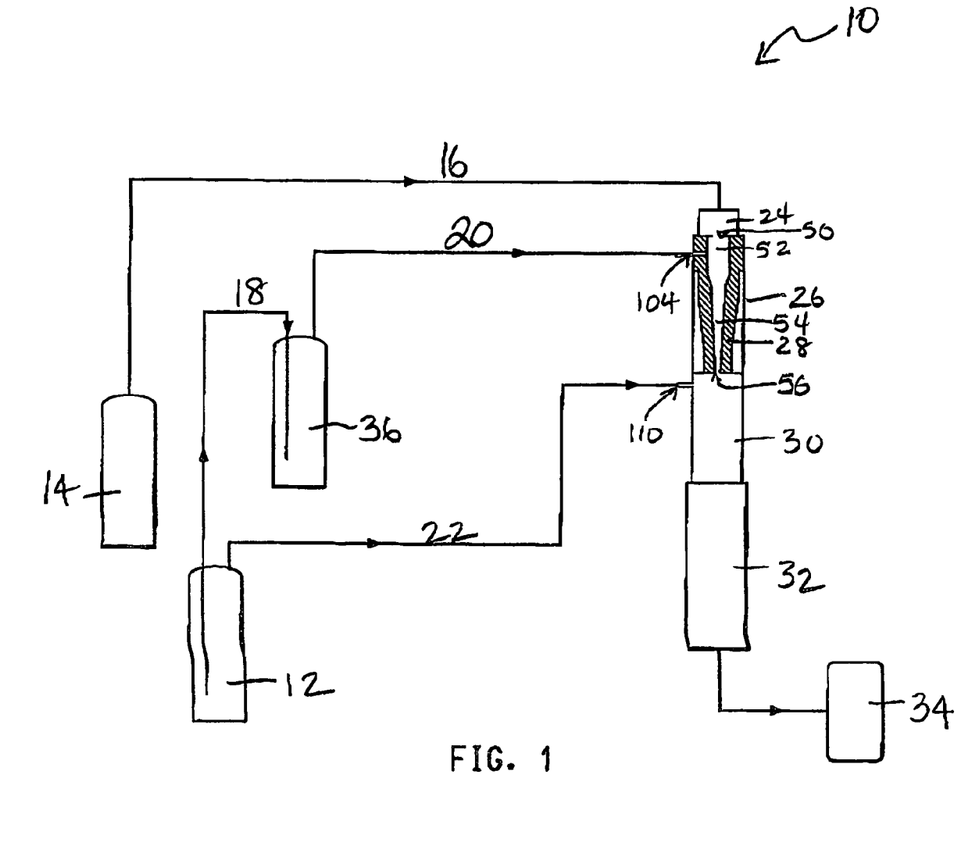
FIG. 1 is a simplified cutaway diagram of a plasma reactor system for nanoparticle synthesis in accordance with the present invention. In this Figure only one reactant inlet is illustrated at 104.
Figure 2A:
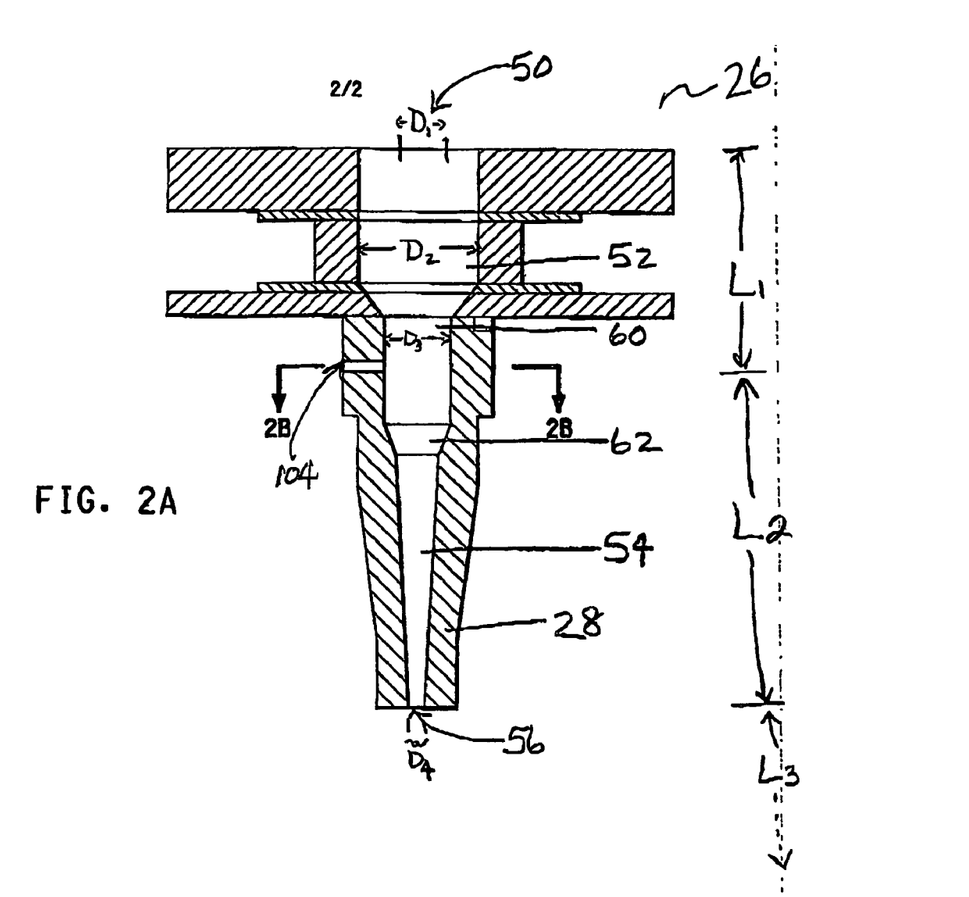
FIG. 2a is a simplified schematic diagram of the reaction chamber.

Throughout the Figures herein, recurring elements are designated with by the same number and symbol. A plasma reactor system according to the present invention (a nanoparticle generating reactor or aerosol reactor) 10 is schematically shown in FIG. 1. The reaction chamber 26 is schematically shown in FIG. 2a.

In FIG. 1, the reactor consists of a high temperature energy source 24, reaction chamber 26 (also shown in FIG. 2a), quenching chamber 30 and product collector 32. Each of these regions of the reactor chamber is cooled by fluid circulating within the walls of the reactor chamber (not shown). The preferred cooling fluid for use in the present invention is water.

In a preferred embodiment, the energy source 24 is a DC arc plasma torch. As shown in FIG. 1, the carrier gas is supplied from tank 14 through line 16 to the energy source 24. The heating source is also cooled by a cooling fluid circulation through a cooling jacket (not shown). The preferred coolant is water. The reaction chamber of the present invention comprises a wall 28, an inlet 50 and an outlet 56, the inlet for introducing a hot carrier gas to the reaction chamber, and the hot carrier gas flows from the inlet through the reaction chamber and out the outlet. It further comprises a homogenizer which provides the spacer zone 52 and the homogenization zone 54.

The reaction chamber may be made of any material of construction that is suitable for use in high temperature, oxidizing and/or corrosive environments. High purity alumina can be employed. It may be made of a material of construction that meets the following requirements: a good heat insulator; able to withstand temperatures that can be achieved using plasma heating; able to survive thermal shock; able to survive oxidizing and reducing environments depending on the application; and able to survive a corrosive environment. The homogenizer can be made of any suitable material, with ceramic materials being preferred.

The reactants, for example titanium tetrachloride and oxygen, are injected through line 20 into the reaction chamber through inlet 104 (preferably three equally-spaced radial inlets) as vapor in a carrier gas (generally oxygen) by first bubbling oxygen housed in cylinder 12 through line 18 into a liquid reactant TiCl$_4$ stored in 36, and then through line 20 into the reaction chamber. On entering the reaction chamber and contacting the hot carrier gas flow from the energy source, the reaction is initiated and continues as the reactants flow downstream toward reaction chamber exit 56, and into the quench zone, into the quenching chamber 30, where quenching gas 22 from tank 12 is radially introduced into the quench chamber through inlets 110. Additionally, the temperature of the aerosol stream is reduced by mixing with the quenching gas. As a result the rates of particle coagulation and aggregation are reduced. Further downstream the particles are collected in the product collector 32. In the present example, a sintered metal filter is used to collect the product, although any suitable collection device, made of a suitable material, could be used. The gas flow exiting the filter is discharged into a scrubber 34. In one embodiment of this process, primary particles in the sub-50 nm range are formed with the reaction chamber.

As shown in FIG. 2a, the reaction chamber consists of two zones. A zone between the hot gas inlet 50, having diameter $D_1$, and one or more reactant inlets 104 is the spacer zone 52, having an upper diameter $D_2$, converging to a lower diameter $D_3$ at the reactant inlets, and has length $L_1$. The region between the reactant inlets 104 and the quench chamber 56 inlet is the homogenization zone 54, having length $L_2$. The spacer zone length $L_1$ must be long enough to have the hot gas flow attached before reaching the reactant inlets. The flow detachment is caused by expanding the hot gas into the spacer region as a free jet, thus inducing flow recirculation. The optimal length of the spacer zone is dependent on the temperature and flow rate of the hot gas, the hot gas inlet 50 with diameter $D_1$ and the diameter of the reactant inlet region 60 $D_3$. Making the spacer zone any longer is at the expense of wasting high temperature energy. The homogenization zone has an initial tubular region followed by a first converging section 62. The homogenizer is designed to have a minimum residence time so that the following tasks are completed before the gas flow exiting the homogenizer: (1) creation of one-dimensional flow and concentration profile; (2) initiation of gas-phase nucleation. This serves as the base of determining the length of the homogenization zone $L_2$, and the diameters $D_3$ and $D_4$, the diameter of the entrance to the quench chamber. Therefore, the dimensions are calculated based on the reaction rate, rate of mixing induced by diffusion and turbulence and nucleation rate. Increasing the flow residence time by increasing the volume of the homogenization zone for fixed flow rate is not advantageous. Once the nuclei are formed the aerosol stream should be quenched immediately so that the particle growth by coagulation and coalescence can be reduced as the temperature decreases. Therefore, a minimum length for the homogenization zone is preferred. Experimentation or calculation may determine the optimal length of the zone with respect to the particular product desired and the process conditions.

In FIG. 2a, a straight extension section of length $L_3$ may optionally be added to the end of the reaction chamber at 56 to adjust final product properties. The length of this zone, $L_3$, does not seem critical. The extended zone may be needed for achieving the desired taper for the nozzle tip or for mechanical reasons, for example.

Figure 2B:
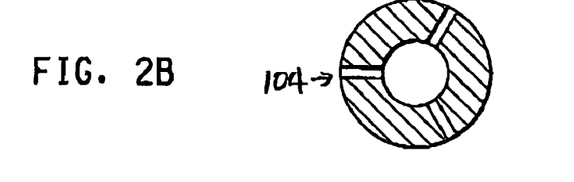
FIG. 2b is a top view of the reaction chamber showing a preferred placement of the reactant inlets.

The reactant(s) are injected directly radially into the reaction chamber. FIG. 1 illustrates one inlet 104 and FIG. 2b, a cross-section of the reaction chamber inlet, illustrates 3 equally-spaced radially-distributed inlets. It is preferable to have multiple inlets.

A high temperature heating means (24) is employed in the present invention. Non-limiting examples of the heating means employed include Direct Current (DC) arc plasma, Radio Frequency (RF) plasma, electric heating, conductive heating, flame reactor and laser reactor. Particularly useful means in the present invention are DC arc plasma and RF plasma.

A reactant stream (20) is employed in the present invention. The stream can be in liquid, solid, vapor, emulsion, dispersion, solution or powder form, or any combination thereof. Non-limiting examples of feed materials include solid particles carried by an inert gas, a reactant gas or combination thereof; a solid precursor positioned inside the heating zone; liquid droplets carried by an inert gas, a reactant gas or combination thereof; vapor phase precursor carried by an inert gas or reactant gas or combination thereof, wherein the vapor phase precursor is a suspension of solid particles and liquid droplets that are generated by an auxiliary apparatus and fed into the apparatus and process of the current invention. Sizes of particles and liquid droplets may be of any useful size.

The shape and dimension of the reaction chamber is predetermined by both experiment and modeling in order to obtain the desired fluid dynamics feature.

A reactant inlet (104) is comprised of a tube, and is employed in the present invention. This tube can be made of any material of construction that can survive a corrosive environment, or any other environment determined by the reactants. The diameter of the tube must be small enough so that high velocities of the reactants are achieved, thereby allowing the reactants to penetrate into the high temperature plasma. The diameter of the tube is determined by the flow rate and desired turbulence.

In summary, the present invention may be distinguished from apparati and processes currently known. The reaction chamber described in the current invention includes a straight region and a convergent section, whereas the nozzles described in U.S. Pat. Nos. (5,935,293 and 5,749,937) by Detering et al., and U.S. Pat. Nos. (5,788,738 and 5,851,507) by Pirzada et al. all have a convergent-divergent shape.

One of the design features of the reaction chamber is to inject the reactants a certain distance downstream from the carrier gas inlet to avoid exposing the reactant(s) to the flow recirculation induced by the hot gas discharging into the reaction chamber. This issue is not addressed in U.S. Pat. Nos. 5,935,293 and 5,749,937 by Detering et al., U.S. Pat. Nos. 5,788,738 and 5,851,507 by Pirzada et al., and U.S. Pat. No. 5,874,134 by Rao et al.

The present invention relates to a high temperature process comprising a unique reaction chamber that is designed to reduce flow recirculation in the region between the hot gas inlet(s) and the reactant inlet(s), and to promote efficient mixing in the region downstream of the reactants inlet(s). As a result of the enhanced mixing, the concentration profile of the product vapor in the homogenizer approaches one-dimension. Thus, nanoparticles with narrow size distribution can be produced.

The process requires a relatively uniform flow profile (i.e., nearly one-dimensional) to aid the formation of narrowly distributed primary nanoparticles, and to prevent recirculation that can promote the formation of hard aggregates. The uniform concentration profile created by the homogenizer enables the nucleation to take place in a very uniform and controlled manner, thus allowing the formation of nanoparticles with relatively narrow particle size distribution.

The present process for producing nanoparticles can be applied to precursors such as solids, liquids, and vapors.

The current invention is also aimed at promoting efficient mixing so that particles can be formed in a more uniform manner. It can be operated subsonically (defined as Mach number<0.5) and the cooling effect created by the expansion is negligible. U.S. Pat. Nos. 5,935,293 and 5,749,937 by Detering et al., U.S. Pat. Nos. 5,788,738 and 5,851,507 by Pirzada et al., aim at obtaining rapid quench via supersonic expansion through a nozzle.

Additionally, the gas pressure at the exit of the reaction chamber can be in the range of 1-5 atmosphere, whereas the applications elsewhere described (U.S. Pat. Nos. 5,935,293 and 5,749,937 by Detering et al., U.S. Pat. Nos. 5,788,738 and 5,851,507 by Pirzada et al., and U.S. Pat. No. 5,874,134 by Rao et al.) all require substantial pressure differential and the pressure at the nozzle exit are well below atmospheric pressure. The apparatus discussed here can be operated using the nozzle with a large pressure gradient to achieve thermodynamic cooling to further improve particle size distribution.

It will be recognized by those skilled in the art of reactor design and modeling that the reaction chamber of the present invention is useful in a variety of reactors in addition those reactors for producing nanosize particles.

Titanium dioxide nanoparticles made according to the present invention may be used with advantage in various applications including sunscreen and cosmetic formulations; coatings formulations including automotive coatings, wood coatings, and surface coatings; chemical mechanical planarization products; catalysis products including photocatalysts used in water and air purification and selective catalytic reduction catalyst supports; photovoltaic cells; plastic parts, films, and resin systems including agricultural films, food packaging films, molded automotive plastic parts, and engineering polymer resins; rubber based products including silicone rubbers; textile fibers, woven and nonwoven applications including polyamid, polyaramide, and polyimides fibers products and nonwoven sheets products; ceramics;

glass products including architectural glass, automotive safety glass, and industrial glass; electronic components; and other uses The following Examples, are not intended to limit the present invention, but to illustrate at least some of the benefits of the present invention.

TEST METHODS

The analytical methods that are listed in the Table are BET surface area, UPA particle size distribution and SAXS particle size distribution. These techniques are briefly described in the following section.

BET Surface Area

The surface areas of powders and solids are calculated using the adsorption of nitrogen at its boiling point via the BET method, S. Brunauer, P. H. Emmett, and E. Teller, JACS 60, 309 (1938). A MICROMERITICS ASAP 2405 (a trademark of Micromeritics, Inc., Atlanta, Ga.) adsorption apparatus is used to measure the amount of nitrogen sorbed; the BET equation is used to calculate the amount of nitrogen corresponding to a monolayer for a given sample. Using an area of 16.2 $Å^2$ per nitrogen molecule under the sorption conditions, the surface area per gram of solid is calculated. Surface area standards from the National Institute of Standards & Technology are run to insure that the reported values are accurate to within a few percent. For non-porous solids (nearly spherical or cubical), the BET surface area can be compared with the size obtained from another technique (e.g. microscopic or particle size analysis). The relationship is $$SA = \frac{6}{\rho * D}$$

where SA is the surface area in $m^2/g$, p the density in g/cc, and D the diameter in microns (μm). This relationship is exact for spheres and cubes. Therefore, the higher the surface area the smaller the particle size.

UPA Particle Size Distribution

The MICROTRAC ULTRAFINE PARTICLE ANALYZER (UPA) (a trademark of Leeds and Northrup, North Wales, Pa.) uses the principle of dynamic light scattering to measure the particle size distribution of particles in liquid suspension. The instrument is manufactured by Leeds and Northrup, North Wales, Pa. The measured size range is 0.003 μm to 6 μm (3 nm to 6000 nm). The dry particle sample needs to be prepared into a liquid dispersion to carry out the measurement. An example procedure is as follow:

(1) Weigh out 0.08 g dry powder.
(2) Add 79.92 g 0.1% tetrasodium pyrophosphate (TSPP) solution in water to make a 0.1 wt. % suspension.
(3) Sonify the suspension for 10 minutes using an ultrasonic probe. The suspension should be cooled in a water-jacketed beaker during sonication.
(4) When sonication is complete, draw an aliquot for analysis.

SAXS Particle Size Distribution

In principal, SAXS measures "electron density" and then calculates the size of an equivalent spherical particle with the measured electron density. The SAXS intensity at a particular angle depends on the electron density contrast between the particle (e.g., $TiO_2$) and the surrounding medium (e.g., air). It also depends on the size of the particles. Large particles scatter mostly at low angles and small particles scatter at larger angles.

The powders are dusted on a piece an adherent substrate. Some of the powder adhere to the substrate, which is mounted on a sample holder. The x-rays (wavelength 0.154 nm, CuKalpha) are produced by standard generators. Two sets of data are collected that cover overlapping ranges in scattering angle. A Kratky instrument is used to collect small-angle scattering at the larger scattering angles (1e-1 to 4e-0 degrees). A Bonse Hart instrument is used to collect small-angle scattering at the smaller scattering angles (2.2e-3 to 5e-1 degrees). The two datasets are combined into a single scan after background subtraction, and the data are subsequently desmeared. These desmeared data are then transformed to a volume size distribution function by the regularization technique. The volume distribution function is the final output of this procedure.

EXAMPLES

Unless otherwise specified, all chemicals and reagents were used as received from Aldrich Chemical Co., Milwaukee, Wis.

Figure 3:
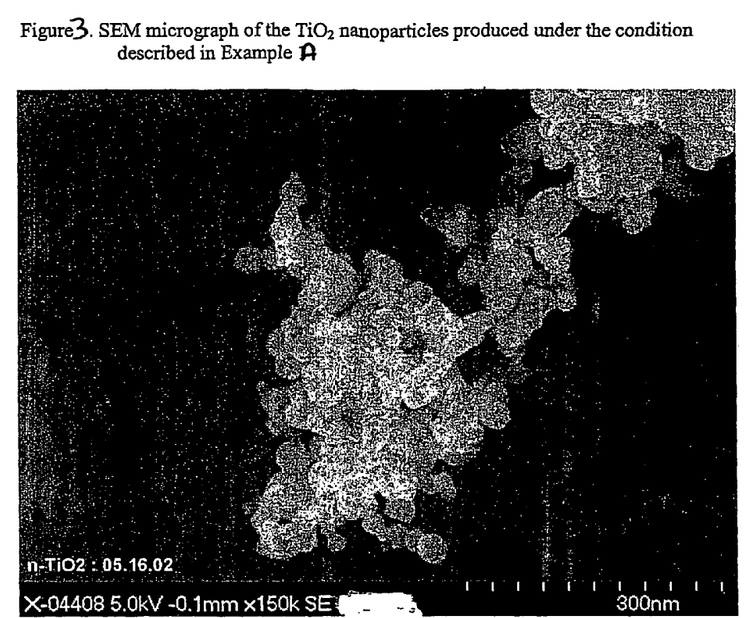
FIG. 3 is a SEM micrograph of $TiO_2$ nanoparticles formed under the condition described in Example A.

Example A $TiCl_4$ vapor was thoroughly premixed with $O_2$ by bubbling $O_2$ at a rate of 10 l/min through a cylinder maintained at room temperature that contains liquid $TiCl_4$. The mixture of $TiCl_4$ and $O_2$ was then introduced into the reaction chamber through three equally spaced radial ports that are 0.32 cm in diameter. The reaction chamber was of cylindrical shape (2.52 cm in diameter, 7.56 cm in height) and did not contain a homogenizer. Gaseous titanium dioxide was formed by $TiCl_4$ oxidation reaction. $TiO_2$ aerosol particles were formed by gas-phase nucleation of the $TiO_2$ vapor followed by condensation and coagulation. At the end of the reaction chamber, room temperature $O_2$ was introduced radially into the quenching chamber at a rate of 30 l/min where the high temperature aerosol stream was lowered by mixing with the room temperature quenching gas. The quenching chamber is of cylindrical shape (2.52 cm in diameter, 20.16 cm in height). Downstream from the quenching chamber, $TiO_2$ particles were collected by a sintered metal filter. The properties of the resulting $TiO_2$ particles are listed in the Table. FIG. 3 is a SEM micrograph of the $TiO_2$ nanoparticles produced under this condition.

Example 1

Figure 4:
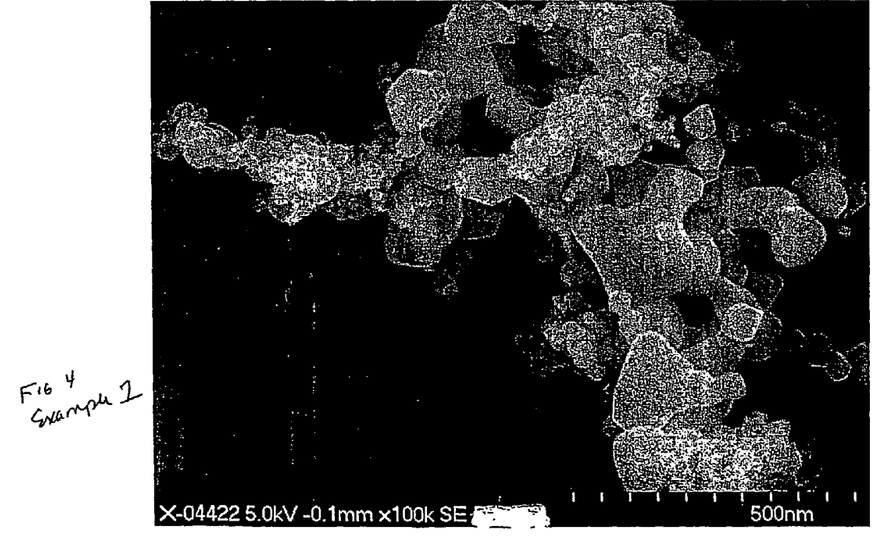
FIG. 4 is a SEM micrograph of $TiO_2$ nanoparticles formed under the condition described in Example 1.

The process of Example A was repeated except that (1) a homogenizer (as shown in FIG. 2a) was installed in the reaction chamber (; (2) the diameter of the $TiCl_4$ injection ports was reduced to 0.02 cm. The dimensions of the homogenizer and the properties of the resulting $TiO_2$ particles are listed in the Table. FIG. 4 is an SEM micrograph of the $TiO_2$ nanoparticles produced under this condition.

Example 2

Figure 5:
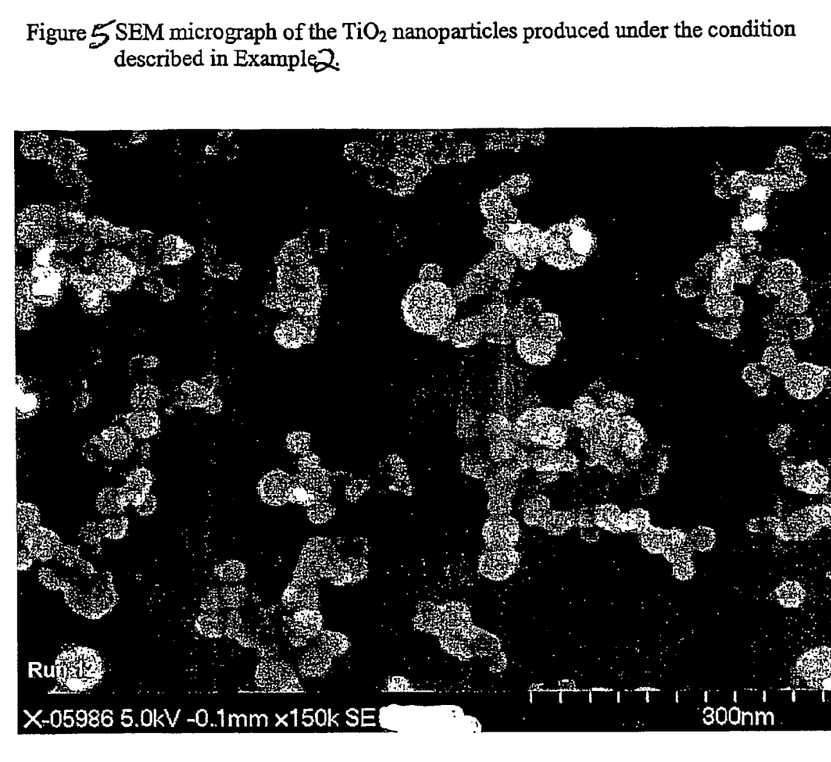
FIG. 5 is a SEM micrograph of TiO$_2$ nanoparticles formed under the condition described in Example 2.

The process of Example 1 was repeated except that $L_1$ of the homogenizer is 0.9 cm. Accordingly, the $TiCl_4$ injection ports were moved upstream by 3.8 cm to the hot gas inlet. The dimensions of the reaction chamber and the properties of the resulting TiO$_2$ particles are listed in the Table. FIG. 5 is an SEM micrograph of the TiO$_2$ nanoparticles produced under this condition.

Example 3

Figure 6:
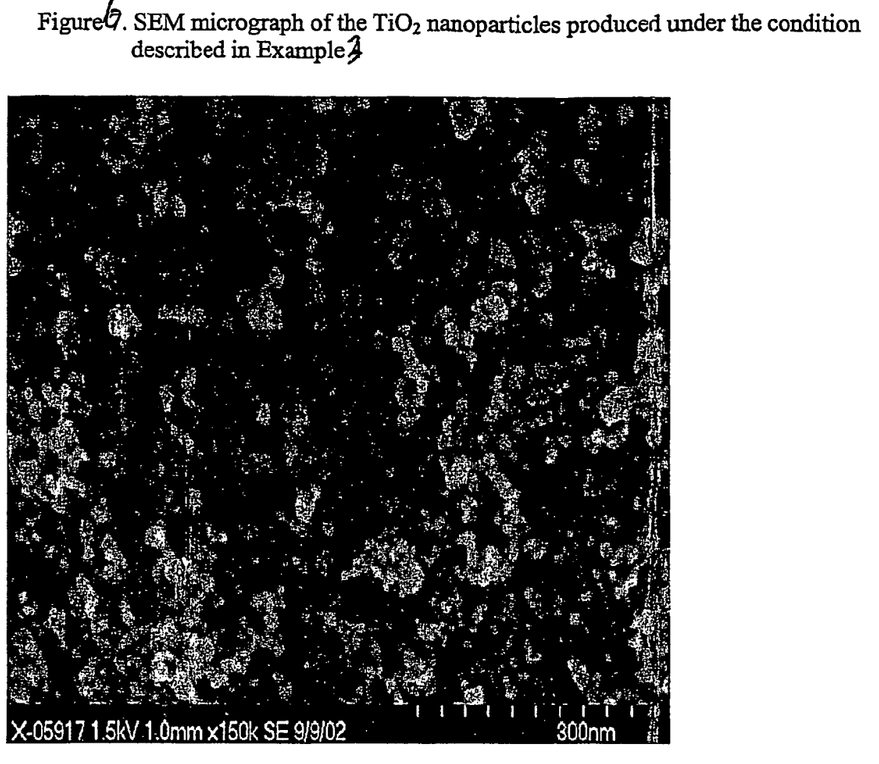
FIG. 6 is a SEM micrograph of TiO$_2$ nanoparticles formed under the condition described in Example 3.

The process of Example A was repeated except a straight section that was 5.6 cm long was added to the reaction chamber (L$_3$ shown in FIG. 2). The dimensions of the reaction chamber and the properties of the resulting TiO$_2$ particles are listed in the Table, below. FIG. 6 is an SEM micrograph of the TiO$_2$ nanoparticles produced under this condition.

Example 4

Figure 7:
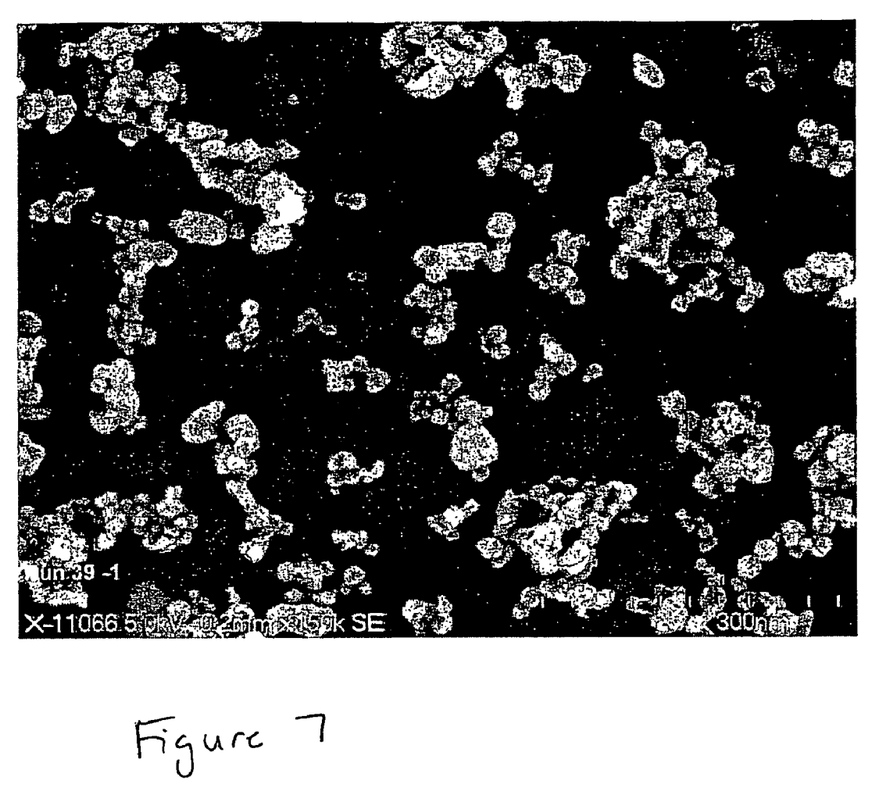
FIG. 7 is a SEM micrograph of TiO$_2$ nanoparticles formed under the condition described in Example 4.

The process of Example A was repeated with a shortened homogenizer (L$_2$ is 2.7 cm) and the diameter of the homogenizer D$_4$ is 0.95 cm. The dimensions of the reaction chamber and the properties of the resulting TiO$_2$ particles are listed in the Table, below. FIG. 7 is an SEM micrograph of the TiO$_2$ nanoparticles produced under this condition.

TABLE

Summary of Homogenizer Dimension and Particle Properties from Examples

| Homogenizer Dimensions | Example Number | | | | |
|---|---|---|---|---|---|
|  | A | 1 | 2 | 3 | 4 |
| D$_1$, cm | NA | 0.8 | 0.8 | 0.8 | 0.8 |
| D$_2$, cm | NA | 2.52 | 2.52 | 2.52 | 2.52 |
| D$_3$, cm | NA | 1.5 | 1.5 | 1.5 | 1.5 |
| D$_4$, cm | NA | 0.5 | 0.5 | 0.5 | 0.95 |
| L$_1$, cm | NA | 4.6 | 0.9 | 4.6 | 4.6 |
| L$_2$, cm | NA | 6.7 | 6.7 | 6.7 | 2.7 |
| L$_3$, cm | NA | 0 | 0 | 5.6 | 0 |
| Reactant inlet diameter, cm | 0.32 | 0.02 | 0.02 | 0.02 | 0.02 |
| vmd$^1$, nm | 97.0 | 37.6 | 51.0 | 36.0 | 57.4 |
| vmd$^2$, nm | 45.3 | 22.9 | 36.5 | 26.2 | 31.4 |
| vmd$^1$/vmd$^2$ | 2.1 | 1.6 | 1.4 | 1.4 | 1.83 |
| Surface Area, m$^2$/g | 44.7 | 103.9 | 57.6 | 99.6 | 73.7 |
| Conversion % | 36 | 32 | 61 | 64 | 98 |

1. vmd$^1$ is volume mean diameter measured by UPA dynamic light scattering.
2. vmd$^2$ is volume mean diameter measured by SAXS, small angle x-ray diffraction.
3. vmd$^1$/vmd$^2$ is the ratio of volume mean diameters measured by each method.
4. Surface area was measured by BET surface absorption.

Based on the results described in the examples and table, the following observations are made. The effect of the reaction chamber on the size of TiO$_2$ nanoparticles is demonstrated by Example A and Example 1. With the homogenizer as in Example 1, the BET surface area increases from 44.7 m$^2$/g to 103.9 m$^2$/g, suggesting a significant reduction in average primary particle size. In the meanwhile the volume median diameter decreases from 97 nm to 37.6 nm, suggesting that the dispersible particle size is substantially reduced. The size uniformity of the primary particles is demonstrated in FIGS. 3 and 4. In FIG. 3 particles above 100 nm and below 30 nm are both observed, while in FIG. 4 the vast majority of the primary particles are in the range of 10-30 nm. Evidently the reaction chamber can reduce the primary particle size, increase the size uniformity of the primary particles and improve the dispersibility.

The importance of the location of the reactant inlets is demonstrated by Example 1 and 2. When the length of the spacer zone is reduced by 3.78 cm, which results in a shorter distance between the reactant inlets and the hot gas inlet, the BET surface area drops from 103.9 m$^2$/g to 57.6 m$^2$/g. In the meanwhile the dispersible volume mean diameter increases from 37.6 nm to 51 nm. The increase in particle size is very likely caused by the entrainment of the reactant gas in the flow recirculation that is induced by the high temperature gas entering in the upstream section of the homogenizer.

Examples 1 and 3 study the effect of the length of the homogenizer after the reaction inlets. In Example 3 a straight section, 5.6 cm long, is added at the end of the homogenizer. The resulting volume median diameter measured by SAXS is increased from 22.9 nm to 26.2 nm. In FIG. 6 the SEM micrograph shows that there is more necking between the primary particles. Thus, if the homogenizer is too long, the nucleus formed by gas-phase nucleation will remain in the homogenizer instead of being exposed to the quenching gas. The high temperature in the homogenizer will result in more particle sintering.

Examples 1 and 4 also demonstrated the impact of the length of the homogenization zone. In Example 4, L$_2$ was reduced from 6.7 to 2.7 cm, the resulting volume particle surface area was decreased from 103.9 m$^2$/g to 73.7 m$^2$/g, and the dispersible volume mean diameter increased from 37.6 nm to 57.4 nm.

What is claimed is:

1. A reactor for the production of nanoparticles in an aerosol process comprising:
   (a) a reaction chamber having a wall, an inlet and an outlet the inlet for introducing a hot carrier gas to the reaction chamber which hot carrier gas flows downward from the inlet through the reaction chamber and out the outlet,
   (b) a quench zone located downstream of the reaction chamber having an inlet and an outlet,
   (c) one or more quench inlets being positioned approximately about the outlet of the reaction chamber for introducing a quench material,
   (d) radially distributed reactant inlets positioned between the reaction chamber inlet and the quench inlets for introducing one or more reactants;
   the reaction chamber comprising a spacer zone and a homogenization zone: (i) the spacer zone having a length, (L1), extending from the reaction chamber inlet and ending approximately about the reactant inlets having an upper diameter converging, upstream of the reactant inlets, to a lower diameter tubular region, the spacer zone having a recirculation zone, the reactant inlets being downstream of the recirculation zone and positioned to introduce reactants into the tubular region, which extends into the homogenization zone, and (ii) the homogenization zone including the tubular region which is followed by a converging section which converges to a nozzle tip, the homogenization zone having a length (L2) extending from approximately the location of the reactant inlets and ending approximately about the quench zone inlet; the spacer zone for allowing the hot carrier gas to carry the reactants downward towards the homogenization zone, the homogenization zone for contacting the reactants under conditions suitable for forming a reaction product and passing the reaction product to the quench zone, (L1) being sufficient for the hot carrier gas to attach to the wall of the spacer zone of the reaction chamber prior to the reactant inlets and (L2) being sufficient for a residence time of the reactants within the homogenization zone suitable for forming the reaction product which when withdrawn from the outlet of the quench zone are nanoparticles.

2. The reactor of claim 1, which further comprises a high temperature heating means for heating the carrier gas selected from the group consisting of a DC plasma arc, RF plasma, electric heating, conductive heating, flame reactor and laser reactor.

3. The reactor of claim 1, which further comprises a DC plasma arc for heating the carrier gas.

4. The reactor of claim 1, which further comprises an RF plasma for heating the carrier gas.

5. The reactor of claim 1, wherein the reaction chamber further comprises a homogenizer which provides the spacer zone and the homogenization zone.

6. The reactor of claim 5, wherein the homogenizer is constructed of copper or ceramic material.

7. A reaction chamber for minimizing flow recirculation in a reactor for the production of reaction product nanoparticles, the reaction chamber comprising a wall, an entrance and an exit a hot carrier gas inlet located about the entrance of the reaction chamber and quench material inlets located about the exit of the reaction chamber and radially distributed reactant inlets located between the hot carrier gas inlet and the quench inlets, the reactant inlets being located downstream of a recirculation zone created by the hot carrier gas as it flows downward from the hot carrier gas inlet toward the reactant inlets, the hot carrier gas inlet and reactant inlets being oriented for a downward flow direction of the hot carrier gas and reactants, the reaction chamber comprising a spacer zone and a homogenization zone (i) the spacer zone having a length, (L1), extending from the reaction chamber entrance and ending about the reactant inlets having an upper diameter converging, upstream of the reactant inlets, to a lower diameter tubular region which reactant inlets are positioned to introduce reactants into the tubular region, the tubular region extending into the homogenization zone and (ii) the homogenization zone including the tubular region followed by a converging section which converges to a nozzle tip and having a length (L2) extending from the reactant inlets to a position downstream of the quench inlets for contacting the hot carrier gas and the reactants and wherein (L1) of the spacer zone is sufficient for the hot carrier gas to attach to the wall of the reaction chamber before the hot carrier gas reaches the reactant inlets and (L2) of the reaction chamber being sufficient for a residence time within the homogenization zone suitable for forming the reaction product nanoparticles.

8. The reactor of claim 1 wherein the reactor is a subsonic reactor.

9. The reactor of claim 1 wherein the hot carrier gas which flows out the outlet has a gas pressure at the outlet in the range of 1-5 atmospheres.

\* \* \* \* \*